3,277,024
METHOD FOR MAKING EXCHANGE RESINS FROM VINYLBENZYL TRIALKYLAMMONIUM ANION EXCHANGE RESINS
Melvin J. Hatch, Midland, Mich., assignor to The Dow Chemical Company, Midland, Mich., a corporation of Delaware
No Drawing. Filed Oct. 3, 1962, Ser. No. 228,030
8 Claims. (Cl. 260—2.1)

This invention concerns a method for making anion, cation and chelate exchange resins wherein resinous polymeric vinylbenzyl trialkylammonium anion exchange resins are used as intermediates in a reaction with ionizable nucleophiles having exchanging groups, in which reaction a tertiary amine is displaced and an exchanging group or a group containing an exchanging group is substituted at benzylic carbon atoms of said polymeric quaternary ammonium resins.

Vinylaryl polymers containing halomethyl groups, such as vinylbenzyl chloride or bromide polymers and copolymers, and chloromethylated or bromomethylated polymeric styrene, including crosslinked chloromethylated or bromomethylated styrene copolymers, are not easily reacted with ionic nucleophilic reagents which latter are soluble in water, polar hydroxylated solvents or aqueous solutions thereof, such as the species

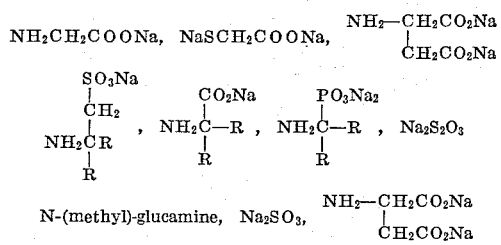

and the like, wherein R is hydrogen, an alkyl group, an aryl group, a substituted alkyl or a substituted aryl group, to establish a covalent bond with such species and the benzylic carbon atoms of the resin to give a resinous polymer having exchanging moieties or groups containing one or more exchanging moieties. This difficulty is due mostly to the hydrophobic nature of the polymer matrix to which halomethyl groups are attached. Mutual solvents which will swell the polymer matrix and also dissolve such reagents are often not practical because of inefficiently in promoting the reaction. The same is often true with analogous reagents which can be converted to have exchanging moieties by a simple hydrolysis or oxidation reaction involving their substituent moieties.

It has now been discovered that conventional resinous polymeric vinylbenzyl trialkylammonium anion exchange resins, i.e., those described in U.S. Patents 2,591,573 and 2,614,099, can be reacted at elevated temperatures with ionizable nucleophiles having ion or chelate exchanging groups or groups which can be oxidized or hydrolyzed to give exchanging groups, in a reaction wherein a tertiary amine is displaced from the quaternary ammoniun ion exchange resin and one or more exchanging groups, precursors thereof or groups containing one or more exchanging groups or precursors thereof are substituted at benzylic carbon atoms of the resin to give exchanging resins of the ion exchanging and/or chelate exchanging types.

As compared with polymeric vinylbenzyl dialkylsulfonium halide resins, which also react readily with ionic nucleophiles to give other exchange resins, the reactions of this invention provide a desirable alternative route for making other exchange resins which in many cases give equal or better yields of less odorous products at no premium in cost as compared with the cost of the vinylbenzyl dialkylsulfonium halide resin route.

The reaction for deriving other exchange resins, i.e., anion, cation and chelate exchange resins, from the aforesaid quaternary ammonium anion exchange resins and ionic nucleophiles is carried out at an elevated temperature ranging between about 140° and about 200° C. in the presence of a water-miscible polar hydroxylated liquid solvent reaction medium, i.e., polyhydric alcohols having up to 6 carbon atoms, such as ethylene glycol, propylene glycol, butylene glycol, polyhydric alcohol condensation polymers, such as poly(ethylene glycol), poly(propylene glycol), and polymeric mixtures of ethylene and propylene glycol, having up to 6 carbon atoms and/or lower monoalkyl ethers of polyhydric alcohol polymers having up to 6 carbon atoms. Alternatively, water may be used as the reaction medium if superatmospheric pressure sufficient to give a temperature of 140° to 200° C. is used. To minimize air oxidation, a blanket of nitrogen or other inert gas is advantageously used.

The amount of ionic nucleophile in excess of that which will react with the quaternary ammonium resin is not important, since excess can be washed out from the reacted resin with a water wash and can be recovered if desired. Generally, a 20 percent to 200 percent excess of ionic nucleophile is used.

In practice, the exchange resins are made by reacting a polymeric vinylbenzylic trialkylammonium resin, wetted with a polar hydroxylated liquid solvent, as indicated above, with a solution in the same or similar liquid solvent of a stoichiometric proportion of an ionic nucleophile to establish a covalent bond with the reactive nucleophilic moieties and the benzylic carbon atoms of said resin, giving a tertiary amine by-product and yielding a substituted vinylbenzylic resin which has exchanging moieties, sometimes at the atom of the reagent which establishes the covalent bond, e.g., with amine reagents, or, alternatively, to yield a substituted vinylbenzylic resin which has exchanging moieties or groups containing moieties attached at said covalent linkage which moieties can be converted to exchanging moieties by a simple hydrolysis or a simple oxidation reaction, e.g., with mercaptoalkane carboxylic acids, mercaptoalkyl nitriles and β-mercaptoalkanols.

The ionic nucleophilic reagents which can be reacted with quaternary ammonium anion exchanging resins to give different exchanging resins are those which are ionizable and have an exchanging moiety or a moiety which can be transformed to an exchanging moiety by a simple hydrolysis or oxidation reaction, are soluble to the extent of at least 5 weight percent in water, aliphatic liquid monohydric and polyhdric alcohols having up to 6 carbon atoms, liquid polyhydric alcohol polymers such as poly(ethylene glycol), poly(propylene glycol) and polymeric mixtures of ethylene and propylene glycol having up to 6 carbon atoms and/or lower monoalkyl ethers of liquid polyhydric alcohol polymers, having up to 6 carbon atoms; which reagents react in stoichiometric proportions at 20° to 100° C. with benzyl chloride to displace at least 5 mole percent of chloride therefrom in 48 hours to form a covalent linkage with the benzylic carbon atom; which reagents are chemically stable by themselves when heated for 48 hours in solution in the above solvents at temperatures of 150° C. or less.

By "ionic nucleophile" is meant a nucleophilic reagent which has a measurable ionization in solution and contains an exchanging group or a precursor thereof. The above-characterized ionic nucleophilic reagents used in the method of this invention encompass many diverse operable compounds and exclude inoperable compounds. The characterizing data make definite and certain to the art skilled these numerous reagents. By way of example, ionic nucleophiles useful in the practice of this invention include $NH_3$, metal salts of $H_2SO_3$ and HCN; hydrocarbonyl and substituted hydrocarbonyl amines, whether primary or secondary, e.g., methylamine, n-amylamine, benzylamine, isopropylamine, sec.-butylamine, allylamine, n-propylamine, n-butylamine, isoamylamine, isobutylamine, 2-aminoethanol, 1-amino-2-propanol, 2-amino-2-methyl-1-propanol, 2-methoxyethylamine, n-hexylamine, 3-amino-1-propanol, n-decylamine, diethylamine, dimethylamine, di-n-propylamine, di-n-butylamine, diisoamylamine, 2,2'-iminodiethanol, di-n-amylamine, 1-diethylamino-2-propanol, di-sec.-butylamine, di-n-hexylamine, $\beta'\beta'$-iminodipropionitrile, N-methyltaurine sodium salt, 2-ethylaminoethanol, N-ethyl-n-butylamine, iminodiacetic acid disodium salt monohydrate, iminodiacetonitrile, diethyl iminodiacetate, N-methyl-n-butylamine, ethylenediamine, 1,2-propanediamine, triethylenetetramine, diethylenetriamine, tetraethylenepentamine, 1,6-hexanediamine, 1,3-propanediamine, 3,3'-diaminodipropylamine and 1,8-p-methane diamine.

Other ionic nucleophilic reagents include amino acids and their soluble metal salts, e.g., those of glycine, L-(—)-cystine, DL-$\alpha$-alanine, $\alpha$-aminoisobutyric acid, DL-$\beta$-phenylalanine, DL-aspartic acid, L-(+)glutamic acid, DL-valine, DL-$\alpha$-amino-n-butyric acid, DL-leucine, L-(—)-leucine, DL-methionine, 4-aminobutyric acid and $\beta$-alanine.

Still other such reagents include metal salts of hydroxyl-containing compounds, e.g., the alcoholic and phenolic compounds such as 4-hydroxybenzoic acid and its metal salts or 4-hydroxy, 4'-carboxybiphenyl and its metal salts; metal salts of mercaptan compounds, whether alkyl or aryl, e.g., o-carboxyphenyl mercaptan, o-carboxycyclohexyl mercaptan, $HSCH_2CO_2H$, $HSCH_2CH_2CO_2H$, $HSCH_2CH_2SO_3H$, $HSCH_2PO_3H_2$, $HSCH_2CH_2OH$, $HSCH_2CH_2CN$ and $HSCH(CO_2H)CH_2CO_2H$.

Further reagents include hydrocarbonyl amines having a substituent of the group of —CN, —$CO_2^-$, —$PO_3^=$, —$SO_3^-$, —$O^-$, —$N^=$.

Of the many ionic nucleophilic reagents characterized above which are operable in this invention, it would be expected, as was indeed found, that the smaller molecules more readily penetrate and react more rapidly with the lower and higher crosslinked vinylbenzylic trialkylammonium anion exchange resins, while the larger molecules of nucleophilic reagent more readily penetrate and react more rapidly with the lower crosslinked resins. To determine the desirability and reaction characteristics of a given quaternary ammonium anion exchange resin with a given molecular weight nucleophilic reagent, a simple trial reaction followed by a capacity test is all that is needed. Alternatively, the absorption characteristics of the reactant anion exchange resin for a given nucleophilic reagent can be tested by immersing a resin sample of the desired crosslinkage in a large amount of solution of the desired reagent, withdrawing the resin particles, draining the resin particles free of excess reagent, washing the reagent-wet resin with a solvent for the nucleophile and determining the amount of reagent present in the wash solution. The amount of reagent absorbed by the resin is compared with the amount of reagent retained on the surface of glass beads or other impermeable particles having the same particle size as that of the resin particles. Such a comparison gives a value of relative permeability of a given reagent for reactant resins of varying crosslinkages.

The reaction between a vinylbenzylic trialkylammonium anion exchange resin and an ionic nucleophilic reagent is advantageously carried out at a reaction temperature between about 140° C. and up to the boiling point of the reaction medium, usually up to ca. 200° C., for a reaction time of about one-half hour up to several days. If lower temperatures are employed, longer reaction times are generally desirable. Generally, the nucleophilic reagent is present in excess up to about 200 percent of theory. The excess can be recovered, hence the amount of excess is not important. Alternatively, the exchange resin can be formed in situ from halomethyl vinylaryl polymers, tertiary amines and the indicated ionic nucleophilic reagents, advantageously in a pressure vessel if a volatile amine is employed.

Examples which follow show ways in which the invention has been practiced. Typical reactions of the quaternary ammonium resin with an ionic nucleophile can be summarized by the following equation:

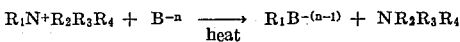

wherein $R_1$=a vinylbenzylic resin matrix, $B^{-n}=SO_3^=$,

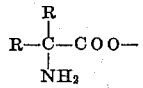

or other nucleophile wherein $n$ is an integer and $NR_2R_3R_4$=a tertiary amine, all as previously described in detail.

Examples which follow describe completely representative specific embodiments of the invention. They are not intended to limit the invention other than as defined in the claims.

*Example 1.*—A quantity of 152 ml., wet settled volume, of resinous polymeric vinylbenzyl trimethylammonium chloride beads crosslinked with one percent divinylbenzene, 50–100 U.S. mesh size, known as Dowex 1–X1 Cl⁻ resin, was rinsed three times with $HOCH_2CH_2OH$, filtered (vac.) and put in a flask. (Approx. moles of resin, Cl⁻ basis, =0.10). To 150 ml. $HOCH_2CH_2OH$ were added 40 g. of $HN(CH_2COOH)_2$, 0.30 mole, and 24 g., 0.60 mole, of NaOH pellets, and the slurried mixture was added to the flask containing the resin beads. The flask contents were stirred and heated to mild reflux at 175° C. under $N_2$ for 15 hours. Water was then added and the reacted beads were filtered. The beads were well swollen and were a brown color. A small portion of the beads gave a blue color with $Cu(NH_3)_4^{++}SO_4^=$ solution, ca. ½ ml. The product totaled 138 ml., wet settled volume, of water-washed product, polymeric vinylbenzyl iminodiacetic acid disodium salt.

*Example 2.*—A quantity of 162 ml., 73 meq., of one percent crosslinked Dowex 1 Cl⁻ (50–100 mesh) resin was washed twice with ethylene glycol. The resin was filtered and slurried into a flask with ethylene glycol. Then 150 ml. of ethylene glycol and 27.6 g., 300 mmole, of $HSCH_2COOH$ and 24 g., 600 mmole, of NaOH pellets were added. The mixture was stirred and heated at 158° C. (mild reflux occurred in the condenser) under $N_2$ for 21 hours. The product resin, washed, had a wet settled volume of 140 ml. It was yellow-tan in color and had a 0.345 meq./$Cu^{II}$ capacity per ml. Conversion equaled 67 percent of theory of polymeric vinylbenzyl thioacetic acid sodium salt.

*Example 3.*—A quantity of 164 ml., 74 meq., of one percent crosslinked Dowex 1 Cl⁻, 50–100 mesh, resin was washed twice with ethylene glycol. The resin was filtered and slurried into a flask equipped with a condenser with 150 ml. of ethylene glycol plus 45 g., 300 mmole, of mercaptosuccinic acid. Then 36 g., 900 mmole, of NaOH pellets was added. The mixture was stirred and heated at mild reflux, 153° C., under a $N_2$ stream for 21 hours. The filtered washed resin product was a tan brown color. Its wet settled volume was 91 ml., its $Cu^{II}$ capacity, 0.44 meq./ml. Conversion was thus 54 percent of theory to polymeric vinylbenzyl mercaptosuccinic acid disodium salt.

*Example 4.*—A quantity of wet 60 ml. Dowex 1–X2 resin, 38 meq., 15 g. sodium sulfite and sufficient water to dissolve the sulfite was mixed together, then 90 ml. of ethylene glycol was added and the mixture was heated to 150° C. The water was distilled off and the remaining mixture was heated at 150° C. for 23 hours. Product resin was washed with water and yielded 38.5 ml. wet settled volume in water. Its copper capacity was 0.05 meq./ml.

*Example 5.*—A quantity of 10.2 ml., 14 meq., wet Dowex 1–X12 resin, 4.1 g., 45 mmole, mercaptoacetic acid and 3.6 g., 90 meq., of sodium hydroxide was mixed together with sufficient water to dissolve the solids. This mixture was added to 58 ml. of propylene glycol and heated to distil off the water. The mixture then was heated at 150° C. for 23 hours and the product resin was washed with water. The resulting resin volume was 10 ml. Its copper capacity was 0.163 meq./ml.

*Example 6.*—A quantity of 11.5 ml., 13.7 meq., wet Dowex 1–X4 resin, 3 g., 20 mmole, mercaptosuccinic acid and 2.4 g. sodium hydroxide was mixed with sufficient water to dissolve the solids. The mixture was then added to a 50/50 mixture of ethylene glycol and diethylene glycol, 60 ml. total, and heated to distil off the water. The reaction mixture was then heated under nitrogen at 150° C. for 19 hours and the product resin was washed with water. Its volume was 4.2 ml. and its copper capacity was 0.05 meq./ml.

*Example 7.*—A quantity of 9.5 ml., 5 meq., wet Dowex 1–X1 resin, a 3-fold excess of glycine, 1.12 g. or 15 mmole, and water to dissolve the solids was added to a 50/50 mixture of diethylene glycol monomethyl ether and ethylene glycol, to give a total volume of 50 ml. After flashing off the water, the reaction mixture was heated at 150° C. under nitrogen for 23 hours. Product resin had a volume of 2.5 ml. and a copper capacity of 0.76 meq./ml.

*Example 8.*—Nine and one-half ml., 5 meq., of wet Dowex 1–X1 resin, 2.8 g. of tetraethylene pentamine and 50 ml. of ethylene glycol were heated together under nitrogen at 150° C. for 23 hours. Product resin after washing with water had a volume of 3.2 ml. and a copper capacity of 0.28 meq./ml. Its total capacity for hydrochloric acid adsorption was 2.13 meq./ml.

*Example 9.*—Twenty-seven ml., 13 meq., wet Dowex 1–X1 resin was dewatered by washing with ethylene glycol. Then 2.9 g., 39 mmole, glycine and 1.6 g., 39 meq., sodium hydroxide were added. Then 50 ml. of ethylene glycol was added and the mixture was heated under nitrogen for 28 hours at 175° C. Water washed product resin had a volume of 7 ml. and a copper capacity of 0.224 meq./ml.

*Example 10.*—Twenty-seven ml., 13 meq., wet Dowex 1–X1 resin was dewatered by washing with ethylene glycol. Then 7.4 g., 13 meq., of tetraethylene pentamine in 50 ml. of ethylene glycol, was added and the mixture was heated under nitrogen for 28 hours at 175° C. The product resin had a volume of 6 ml., a copper capacity of 0.39 meq./ml. and a total capacity for hydrochloric acid adsorption of 2.4 meq./ml.

What is claimed is:

1. A method for making an exchange resin by reacting at a temperature between about 140° C. and 200° C. in the presence of a liquid polar hydroxylated solvent having a boiling point above about 100° C. a vinylbenzyl trialkylammonium anion exchange resin with an ionizable nucleophilic reagent which is soluble to the extent of at least 5 percent by weight in a member of the group consisting of water and aliphatic liquid alcohols having from 1 to 10 carbon atoms in the molecule, said reagent being one having a property of reacting in stoichiometric proportions with benzyl chloride at 20° to 100° C. to displace at least 5 mole percent of chloride therefrom in 48 hours, which reagent comprises a group which establishes a covalent bond with the benzylic carbon atom of the resin and displaces a trialkyl amine by-product, in amount sufficient and for a time sufficient to yield a substituted vinylbenzylic resin, the substituents of which are members of the group consisting of groups which have exchanging moieties and those which have moieties which can be converted to exchanging moieties by a simple reaction of the group consisting of hydrolysis and oxidation reactions.

2. The method of claim 1 wherein the nucleophilic reagent is sodium sulfite.

3. The method of claim 1 wherein the nucleophilic reagent is disodium iminodiacetate.

4. The method of claim 1 wherein the solvent is ethylene glycol.

5. The method of claim 1 wherein the nucleophilic reagent is disodium mercaptoacetate.

6. The method of claim 1 wherein the nucleophilic reagent is trisodium mercaptosuccinate.

7. The method of claim 1 wherein the nucleophilic reagent is sodium glycinate.

8. The method of claim 1 wherein the nucleophilic reagent is tetraethylene pentamine.

No references cited.

WILLIAM H. SHORT, *Primary Examiner.*

C. A. WENDELL, *Assistant Examiner.*